(12) United States Patent
Kuroki et al.

(10) Patent No.: US 7,965,776 B2
(45) Date of Patent: Jun. 21, 2011

(54) APPARATUS AND METHOD FOR PROCESSING AND DISPLAYING PICTURES

(75) Inventors: Kenichiro Kuroki, Kawasaki (JP); Yuji Tajima, Kawasaki (JP); Nobutaka Yamagishi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1367 days.

(21) Appl. No.: 11/347,383

(22) Filed: Feb. 6, 2006

(65) Prior Publication Data
US 2006/0139446 A1 Jun. 29, 2006

Related U.S. Application Data

(63) Continuation of application No. PCT/JP03/11795, filed on Sep. 16, 2003.

(51) Int. Cl.
*H04N 7/12* (2006.01)
(52) U.S. Cl. .............. 375/240.25; 348/14.13; 382/232; 375/240
(58) Field of Classification Search .................. 375/240
See application file for complete search history.

(56) References Cited

U.S. PATENT DOCUMENTS

| | | | | |
|---|---|---|---|---|
| 4,947,344 A | * | 8/1990 | Hayashi et al. | 345/658 |
| 5,751,865 A | | 5/1998 | Micco et al. | |
| 6,088,395 A | * | 7/2000 | Wang et al. | 375/240 |
| 6,442,302 B2 | * | 8/2002 | Klassen | 382/296 |
| 6,567,571 B1 | * | 5/2003 | Kochi et al. | 382/312 |

FOREIGN PATENT DOCUMENTS

| | | |
|---|---|---|
| JP | 10-112796 | 4/1998 |
| JP | 2001-086318 | 3/2001 |
| JP | 2003-179758 | 6/2003 |

* cited by examiner

*Primary Examiner* — Shuwang Liu
*Assistant Examiner* — Lihong Yu
(74) *Attorney, Agent, or Firm* — Fujitsu Patent Center

(57) ABSTRACT

The invention is directed to a technique for realtime processing of photographed pictures with less memory requirements. An image compressor compresses unit images, and so on of a given source picture individually. By converting reference data of compressed unit images and so on, the image compressor creates compressed data of the source picture. From the image compressor, a reference parameter generator receives original reference data corresponding to each unit image and so on having undergone the reference data conversion. An image decompressor retrieves a plurality of compressed unit images, and so on in an order suitable for a specified image editing operation. The image processor outputs the decompressed unit images after editing them to effect the specified image editing operation.

9 Claims, 13 Drawing Sheets

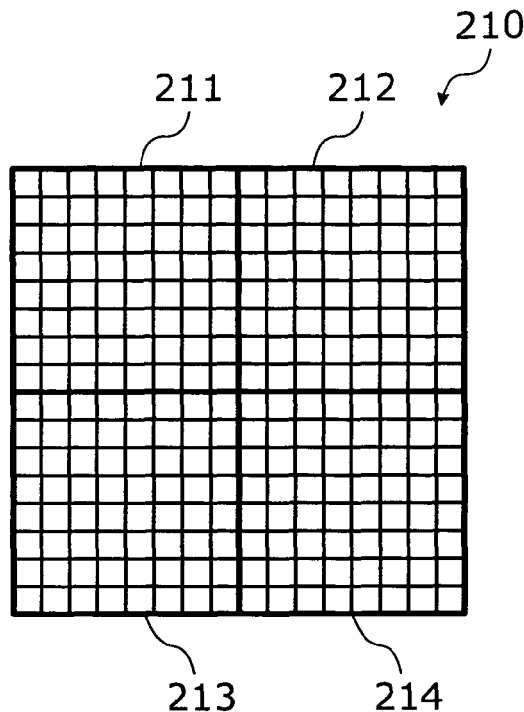
FIG. 5
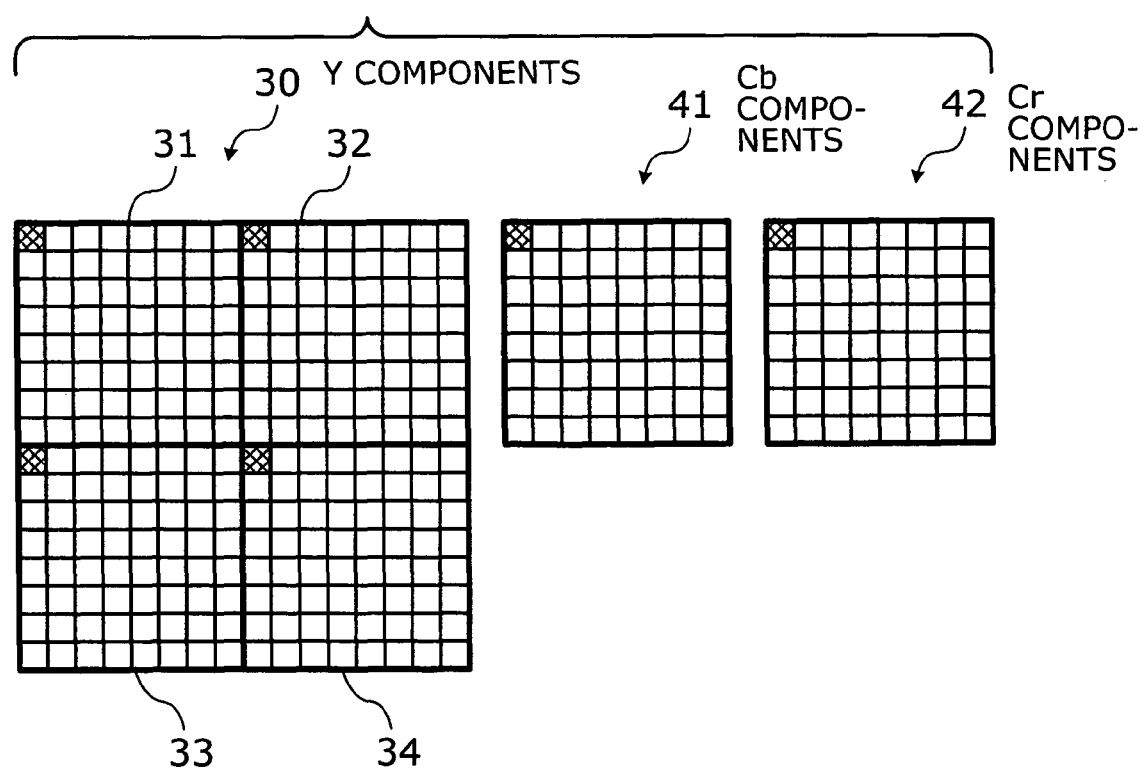

APPARATUS AND METHOD FOR PROCESSING AND DISPLAYING PICTURES

This application is a continuing application, filed under 35 U.S.C. §111(a), of International Application PCT/JP2003/011795, filed Sep. 16, 2003.

BACKGROUND OF THE INVENTION

1. Field of the Invention

The present invention relates to an apparatus and method for processing and displaying pictures, and particularly to a picture processing and displaying apparatus and method that process and display a photographed digital picture in a realtime fashion.

2. Description of the Related Art

Most digital cameras output photographed pictures on their liquid crystal display or the like in a realtime fashion, thus enabling the display to function as a viewfinder. Some digital cameras have a function of editing a source picture before it is output. Such editing functions include rotation of pictures and left-to-right reversal of pictures.

Realtime processing of a photographed picture starts with storing that picture in a memory for subsequent transform operations. The picture in the memory is edited and displayed on a monitor screen.

Since digital camera users require an increasingly high picture quality in recent years, the number of pixels constituting a digital picture keeps on growing. A digital camera may also be offered as an additional function of mobile phones and other electronic appliances, and higher pixel resolutions are still required in such applications. Actually many existing mobile phones are equipped with a built-in digital camera with resolutions of one million pixels or more. However, as the number of pixels of a picture increases, a larger memory capacity will be required to allow the user to edit that picture, thus resulting in increased product costs.

It would be possible, for example, to store a picture in a memory in compressed form and edit that compressed picture after decoding it in its entirety. Besides requiring a large capacity memory, this method has a large processing latency (i.e., a long delay time from photographing to displaying), which is quite unsuitable for the viewfinder applications mentioned above.

As can be seen from the above, decoding a picture for the purpose of subsequent editing essentially requires a memory capable of storing a decoded picture. It is therefore desirable to develop a function that can edit a picture while decompressing compressed data, but not storing every decoded image. In that case, it is necessary to start decompressing compressed data at any block or unit image constituting compressed data.

Compressed data contains image components of each block in coded form, and those coded components of a block may include information about differences between blocks. Take a coding method according to the Joint Photographic Coding Experts Group (JPEG), for example. This method encodes a picture on an individual block basis. The coded data includes direct current (DC) components coded in the form of block-to-block differences. Suppose now that it is required to decode a particular area of such differential-coded data. The required data, however, can only be obtained by decoding blocks sequentially from the very first block.

To address the above drawback, there is a technique that enables compressed data to be decoded from any block. Specifically, this technique defines a "starting block" beforehand so as to decode a compressed image file from an intermediate point. The term "starting block" refers to a block that will be located at the topmost row when an editing operation (e.g., rotation by 90 degrees) is done. The proposed technique decodes a compressed image file, while saving a file pointer and DC components (before differential coding) of the starting block. The proposed technique then decodes a picture from the starting block of the compressed data. Because its own DC component has already been stored, the starting block can be decoded without the need for calculating its difference from other blocks (see, for example, Japanese Patent Application Publication No. 2001-86318).

According to the technique disclosed in Patent Literature 1, however, it is necessary to decode compressed data to store the DC component of the starting block. This decoding leads to an increased processing latency, while relaxing memory capacity requirements. The technique of Patent Literature 1 is therefore unsuitable for realtime applications.

SUMMARY OF THE INVENTION

In view of the foregoing, it is an object of the present invention to provide a picture processing and displaying apparatus and method that can perform a realtime editing operation of photographed pictures with less memory requirements.

To accomplish the above object, the present invention provides a picture processing and displaying apparatus. The picture processing and displaying apparatus according to the present invention is designed to perform compression, decompression, and editing of pictures in a realtime fashion, the apparatus comprising: a compressed data buffer for storing compressed data; a reference image buffer for storing parameters used in decompressing data; an image compressor that compresses each individual unit image of a given source picture, produces compressed data of the source picture by converting reference data of at least one compressed unit image to another value determined from comparison between that reference data and prescribed data in another unit image, and stores the resulting compressed data in the compressed data buffer; a reference parameter generator that receives, from the image compressor, original reference data corresponding to each unit image having undergone the reference data conversion and stores the received reference data in the reference image buffer, together with information that associates the stored reference data with the unit images corresponding thereto; an image decompressor that retrieves a plurality of compressed unit images from the compressed data buffer in an order determined according to a specified image editing operation, retrieves original reference data corresponding to each retrieved unit image from the reference image buffer, and decompresses the retrieved compressed unit images by using the retrieved reference data; and an image processor that edits and outputs the unit images decompressed by the image decompressor, according to the specified image editing operation.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows components of a source picture.

DESCRIPTION OF THE PREFERRED EMBODIMENTS

Several embodiments of the present invention will be described below with reference to the accompanying drawings.

The following description begins with an overview of the present invention to be embodied and then proceeds to more specific embodiments of the invention.

Figure 1:
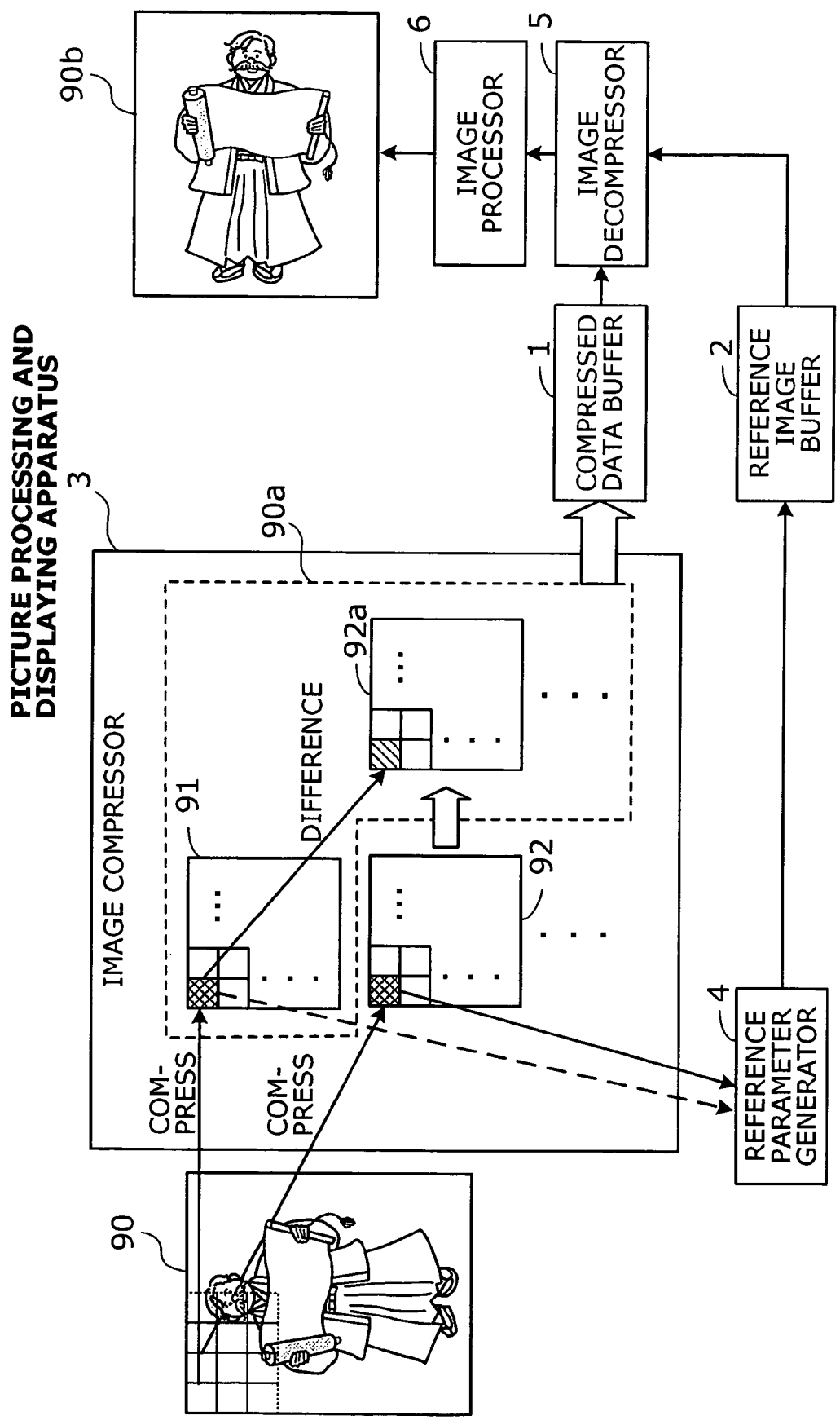
FIG. 1 shows the concept of an apparatus in which the present invention is embodied.

FIG. 1 shows the concept of an apparatus in which the present invention is embodied. The illustrated picture processing and displaying apparatus according to the present invention is designed to perform compression, decompression, and editing of pictures in a realtime fashion. To this end, the apparatus comprises the following elements: a compressed data buffer 1, a reference image buffer 2, an image compressor 3, a reference parameter generator 4, an image decompressor 5, and an image processor 6.

The compressed data buffer 1 is a storage device for storing compressed data. The compressed data buffer 1 is only required to have a sufficient capacity for data obtained by compressing a given source picture 9.

The reference image buffer 2 is a storage device for storing parameters used in decompressing data. The reference image buffer 2 is only required to have a sufficient capacity for storing reference data contained in unit images 91, 92, and so on of a given source picture 90, as well as for storing other information that associates the reference data with those unit images. Here the reference data of a unit image refers to, for example, an average pixel level of that unit image.

The image compressor 3 compresses each individual unit image 91, 92, and so on of the given source picture 90. The image compressor 3 further produces compressed data 90a of the source picture 90 by converting reference data of at least one compressed unit images 92, and so on with another value determined from comparison between that reference data and prescribed data in another unit image. More specifically, this conversion of reference data is to replace the reference data of, for example, a unit image 92 with its difference from reference data of another unit image 91. Optionally, the replaced reference data may further be coded. The image compressor 3 saves the resulting compressed data 90a into the compressed data buffer 1. This compressed data 90a contains unit images 91 having no need for reference data conversion, in addition to unit images 92a and so on whose corresponding reference data have been converted.

From the image compressor 3, the reference parameter generator 4 receives original reference data corresponding to each unit image 92 and so on having undergone the reference data conversion. the reference parameter generator 4 stores those received reference data in the reference image buffer 2, together with some additional information that associates them with their corresponding unit images 92 and so on. The reference image buffer 2 may also accommodate reference data corresponding to the other unit images 91, which have not undergone the reference data conversion. It will be possible to simplify a subsequent decompression process by storing such reference data of all unit images 91, 92, and so on immediately after compression. The memory address of each unit image 92a in the compressed data buffer 1 may be used to associate each unit image 92a with its corresponding reference data. More specifically, in this case, the original reference data will be sent to the reference image buffer 2, together with addresses of the corresponding unit images 92a.

The image decompressor 5 retrieves a plurality of compressed unit images 91, 92a, and so on from the compressed data buffer 1 in an appropriate order for a specified image editing operation. Specifically the image decompressor 5 begins retrieving data for image decompression each time the compressed data buffer 1 receives compressed data 90a representing a whole picture.

The image decompressor 5 also makes access to the reference image buffer 2 to retrieve original reference data corresponding to each retrieved unit image. The image decompressor 5 then decompresses the retrieved compressed unit images 91, 92a, and so on by using the retrieved reference data. Note that the unit image 91 can be decompressed without the need for retrieving its corresponding reference data from the reference image buffer 2 since the unit image 91 has not undergone reference data conversion. The "specified image editing operation" actually refers to picture rotation, mirror-image transform, picture size reduction (i.e., creating thumbnail images), mosaic effect, or the like.

The image processor 6 edits and outputs the unit images decompressed by the image decompressor 5, according to the specified image editing operation.

The above-described picture processing and displaying apparatus operates as follows. When a source picture 90 is entered, the image compressor 3 compresses its constituent unit images 91, 92, and so on individually. The image compressor 3 also creates compressed data 90a from the source picture 90 by converting reference data of at least one compressed unit image 92 and so on with another value determined from comparison between that reference data and prescribed data in another unit image. The resulting compressed data 90a is stored in the compressed data buffer 1. The reference parameter generator 4 saves the reference data of the converted unit images 92 and so on into the reference image buffer 2, together with information that associates those reference data with their corresponding unit images 92a and so on. Then the image decompressor 5 retrieves a plurality of compressed unit images 91, 92a, and so on from the compressed data buffer 1 in an order that is suitable for a specified image editing operation. The retrieved unit images are decompressed according to their corresponding original reference data. The image processor 6 applies the specified image editing operation to those unit images that have been decompressed by the image decompressor 5. The output is then displayed as an edited picture 90b.

The above-described compression process for a source picture 90 includes storing original reference data of its unit images, and that reference data is used to decompress each unit image. Those unit images can therefore be decompressed in any order. A specified image editing operation can be performed on the picture by decompressing its unit images in a particular order corresponding to that specified editing operation. This mechanism enables realtime image processing, obviating the need for a large memory storing an entire picture.

The present invention is applicable to digital cameras and related electronic appliances, including mobile phones with a built-in digital camera, so as to implement JPEG image compression and decompression functions. Think of, for example, a digital camera with a processing function that enables a viewfinder screen to show rotated images. To implement this function, the digital camera needs to perform a series of operations as follows: sensing image --> capturing image data --> JPEG compression --> decompressing and rotating image --> displaying rotated picture.

The following section will explain JPEG compression and decompression.

Image data is a collection of pixels each of which is represented generally in separate components (e.g., RGB (red, green, blue) or YCbCr in the case of color pictures). The JPEG algorithm compresses a picture in the following steps:

(a) Given image data is divided into blocks of eight by eight pixels. Here the minimum coded unit (MCU) is defined to be a single or multiple blocks. MCU is a unit of compressed data elements that are stored. Specifically, four blocks constitute one MCU when compressing an image in the YCbCr420 format, in which four pixels share a single pair of Cb and Cr components. Each block is then subjected to a discrete cosine transform (DCT) process. In the case where the source data dimensions are not a multiple of eight, some padding pixels are added to the right and bottom of the picture as necessary, so that the resulting picture can be divided into MCUs without remainder.

(b) The resulting DCT coefficients are quantized, in which unnecessary high frequency components are discarded.

(c) The quantized data elements are scanned in a zigzag sequence for encoding, where a run-length coding algorithm takes place to compress a succession of, for example, zero-valued data elements. The run-length coding compresses data on the basis of how many same values continue.

(d) The resulting series of quantized data elements is entropy-coded according to a Huffman coding table.

The above sequence of steps compresses image data. The decompression process follows the above steps (a) to (d) in reverse order.

JPEG data contains both DC components and AC components. Of all DCT components obtained at the above step (a), the DC component is found at (0, 0), the upper-left corner of a transformed image. The DC component of a block represents an overall average level of that block. The remaining 63 components are referred to as AC components. The DC component of a block is stored in relative form; i.e., it is represented as a difference from that of the immediately preceding block, whereas the AC components are just what are calculated as DCT coefficients.

As can be seen from the above, JPEG data is compressed on an 8×8 pixel block basis, separately for each kind of components, and stored as separate MCUs. In order to rotate a picture, it is necessary not only to rearrange the order of MCUs, but also to rearrange the block data constituting each MCU.

Think of a process of decoding MCUs partly in the order that they are output. According to a conventional method, all MCUs have to be decoded in the first place so as to obtain the DC components of individual MCUs. It is inefficient, however, to decode all preceding MCUs when decoding a particular MCU. The embodiments of the present invention (described later) thus create an MCU data table containing the following information for each MCU:

1. an address pointer indicating the top memory address of that MCU
2. DC component values This MCU data table is created at the time of JPEG compression.

The decoding process follows a sequence of MCUs described in such an MCU data table, so that output partial images will be obtained in an appropriate order that a specified editing operation requires. Each decoded MCU image is rotated and sent out.

The present invention can be applied in this way to apparatuses that involve JPEG picture compression. The following sections will now describe more specific embodiments of the present invention, with reference to several examples of JPEG picture compressing apparatuses.

FIRST EMBODIMENT

The following section will describe a picture processing and displaying apparatus according to a specific embodiment of the present invention, focusing on its function of rotating a picture in a realtime manner. Realtime picture rotation serves as a useful function for providing a viewfinder image in mobile phone and digital camera applications. The embodiment described below assumes that JPEG pictures are compressed in the format of YCbCr420. The YCbCr format gives a color image as a collection of Y, Cr, and Cb components. Y components represent luminance, or brightness. Cr components represent color differences between red (R) and Y. Cb components represent color differences between blue (B) and Y.

Figure 2:
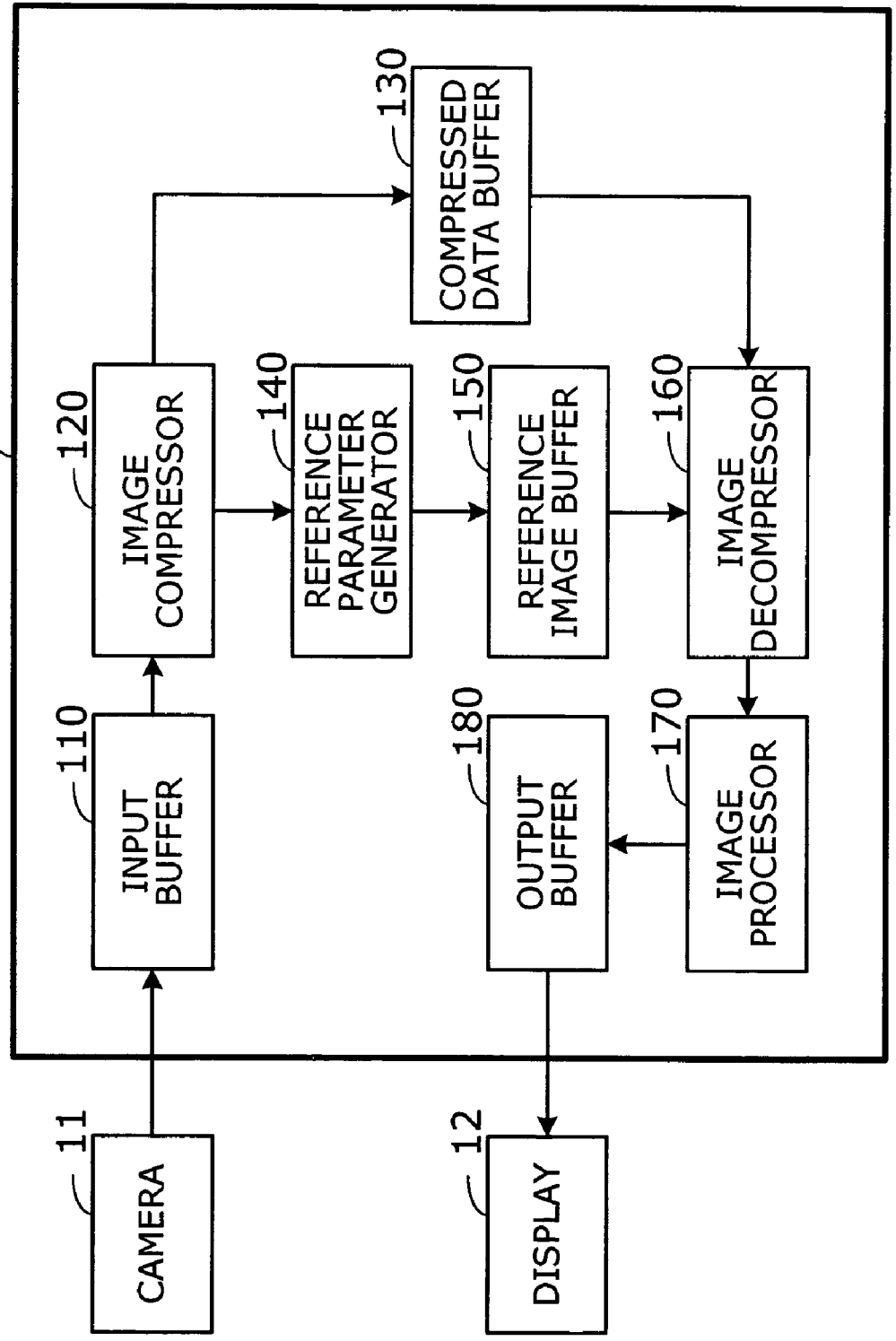
FIG. 2 is a block diagram showing the internal structure of a picture processing and displaying apparatus.

FIG. 2 is a block diagram showing the internal structure of a picture processing and displaying apparatus. A camera 11 and a display 12 are connected to this picture processing and displaying apparatus 100 as shown in FIG. 2. The camera 11 has an image sensor. More specifically, the incoming light through lenses is received and converted to electrical signals by a charge-coupled device (CCD), and the camera 11 produces a picture from those electrical signals. The produced picture is then supplied from the camera 11 to the picture processing and displaying apparatus 100. The display 12 receives image data from the picture processing and displaying apparatus 100 and outputs it on its screen.

The picture processing and displaying apparatus 100 comprises an input buffer 110, an image compressor 120, a compressed data buffer 130, a reference parameter generator 140, a reference image buffer 150, an image decompressor 160, an image processor 170, and an output buffer 180.

The input buffer 110 is a storage device for temporarily storing picture data received from the camera 11. Semiconductor memory devices, for example, may be used to implement this input buffer 110. The input buffer 110 passes stored data to the image compressor 120.

The image compressor 120 receives the picture stored in the input buffer 110, one block at a time, and compresses individual blocks with a JPEG algorithm. The term "block" refers to an image of eight by eight pixels. The compression processes begins with DCT, which is followed by quantization and Huffman coding. The image compressor 120 writes the resulting compressed picture data into the compressed data buffer 130 in units of MCUs. MCU is data necessary for reproduction of unit images. According to the first embodiment, an MCU contains the following six values: 4Y (Y components of four blocks)+1Cb (Cb component of one block)+1Cr (Cr component of one block). In the case of YCbCr422 format, there are four DC components.

The compressed data buffer 130 is a storage device for storing compressed data with a size of one frame.

The reference parameter generator 140 extracts DC components from an image that has been DCT-transformed at the image compressor 120 and sends the result into the reference image buffer 150. The reference parameter generator 140 also obtains the address of a write area when storing a compressed MCU to the compressed data buffer 130. The reference parameter generator 140 saves the obtained write area address of an image in the reference image buffer 150, in association with the DC component of that image.

The reference image buffer 150 is a memory space for storing DC components and addresses of individual MCUs of a single frame.

The image decompressor 160 decompresses compressed data of each MCU stored in the compressed data buffer 130. More specifically, the image decompressor 160 retrieves MCUs from the compressed data buffer 130 in a specified order. The image decompressor 160 then turns to the reference image buffer 150 to read out DC components associated with the address of each retrieved MCU. Using those DC components, the image decompressor 160 decompresses MCUs and passes the resulting image to the image processor 170.

The image processor 170 processes the image decompressed by the image decompressor 160, according to a specified editing command, and sends the resulting picture to the output buffer 180.

The output buffer 180 is a memory space for storing picture data to be displayed. Semiconductor memory devices, for example, may be used to implement this output buffer 180. The picture data in the output buffer 180 is passed to the display 12 as a visual output.

The above-described picture processing and displaying apparatus 100 operates as follows. The input buffer 110 receives a picture photographed by the camera 11. The image compressor 120 reads this picture out of the input buffer 110 for image compression in the JPEG format. The compressed picture data ("compressed data") is put into the compressed data buffer 130. For each MCU of the compressed data, the reference parameter generator 140 extracts DC components and their corresponding MCU addresses out of the image compressor 120. Those associated pairs of DC components and addresses are saved in the reference image buffer 150.

The image decompressor 160 retrieves compressed data of each MCU out of the compressed data buffer 130. At the same time, the image decompressor 160 reads out DC components corresponding to the retrieved MCU from the reference image buffer 150. The image decompressor 160 then decompresses the MCU with those DC components and supplies the image processor 170 with the resulting decompressed image data. The image processor 170 writes each piece of the image data into an appropriate place in the output buffer 180 that is determined from a specified picture editing command. The resulting picture data in the output buffer 180 is then output on the display 12.

The following section will now describe the image compression process in greater detail.

Figure 3:
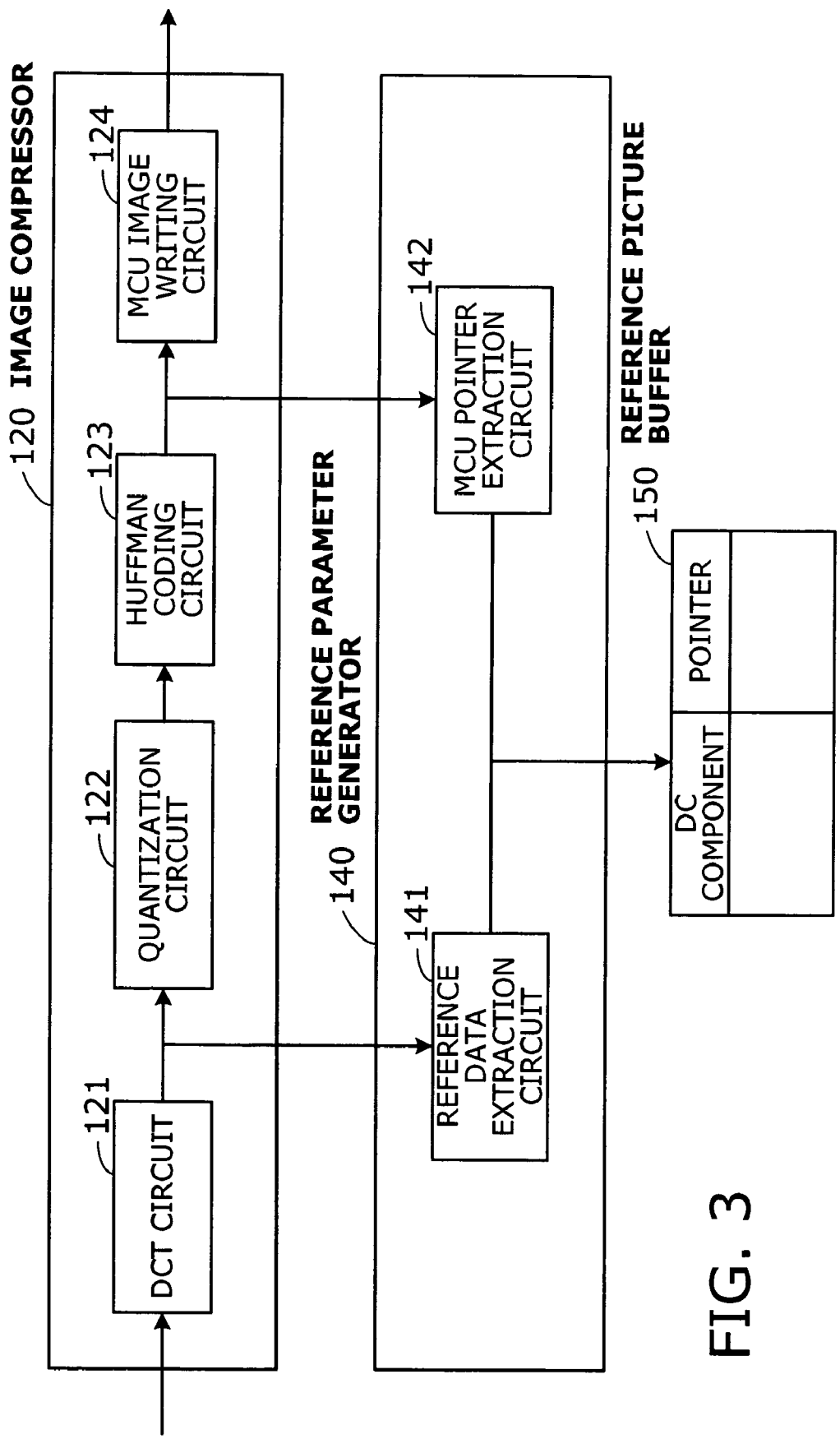
FIG. 3 shows the internal structure of an image compressor and a reference parameter generator.

FIG. 3 shows the internal structure of an image compressor and a reference parameter generator. This image compressor 120 comprises a DCT circuit 121, a quantization circuit 122, a Huffman coding circuit 123, an MCU image writing circuit 124.

The DCT circuit 121 applies a discrete cosine transform (DCT) to given image data. From pixel values (i.e., brightness values of pixels) of an image, the DCT process produces as many DCT coefficients as the number of pixels. According to the first embodiment, the DCT process deals with one 8×8-pixel block at a time, thus yielding 8×8 DCT coefficients. The DCT coefficient at the upper left corner being a DC component. Those DCT coefficients of one block are passed to the quantization circuit 122.

The quantization circuit 122 quantizes the one-block DCT coefficients received from the DCT circuit 121 by dividing them by a predetermined number and replacing each result with a discrete value representing a range of values. Think of, for example, a source picture with a pixel depth of eight bits. DCT coefficients would take values between −1024 and 1023, whose fractional portions are rounded off to 11-bit integers. The data size can be reduced to eight bits per pixel by dividing each DCT coefficient by $2^3(=8)$ and rounding off all digits right to the decimal point. The quantized DCT coefficients (approximate DCT coefficients) are passed to the Huffman coding circuit 123.

The Huffman coding circuit 123 replaces those quantized DCT coefficients with Huffman code (binary code) according to a code table that is prepared beforehand. This process, also referred to as "entropy coding," includes coding of DC components located at the upper left corner of each block. Specifically, a reduced-size image is created by arranging DC components extracted from a plurality of blocks (e.g., 8×8). The reduced-size image is then coded with, for example, a differential PCM (DPCM) algorithm. The DPCM coding encodes an image based on pixel differences (e.g., difference from a pixel on the left). The coded image data (compressed data) is passed to the MCU image writing circuit 124, at which time the Huffman coding circuit 123 also provides the MCU image writing circuit 124 with an address (pointer) of an area that is supposed to accommodate that compressed data.

The MCU image writing circuit 124 writes the compressed data received from the Huffman coding circuit 123 into the compressed data buffer 130 on an individual MCU basis. Specifically, the MCU image writing circuit 124 combines four blocks of compressed data (i.e., Y components of four blocks+Cb component of one block+Cr component of one block) into a single MCU. The MCU image writing circuit 124 writes such MCUs in the compressed data buffer 130 as specified by the Huffman coding circuit 123.

The reference parameter generator 140 comprises a reference data extraction circuit 141 and an MCU pointer extraction circuit 142.

The reference data extraction circuit 141 watches a flow of DCT coefficients from the DCT circuit 121 to the quantization circuit 122 in the image compressor 120 and extracts DC components out of those coefficients. The reference data extraction circuit 141 writes the extracted DC components in the DC component field of the reference image buffer 150, from top to bottom.

The MCU pointer extraction circuit 142 extracts pointers that the Huffman coding circuit 123 passes to the MCU image writing circuit 124 in the image compressor 120. The extracted pointers are then entered to the pointer field of the reference image buffer 150, from top to bottom.

The given source picture is compressed in this way, and the resulting MCUs and reference parameters (DC component-pointer pairs) are stored in the compressed data buffer 130 and reference image buffer 150, respectively.

The following section will describe a process flow of creating MCUs and extracting DC components from a source picture.

Figure 4:
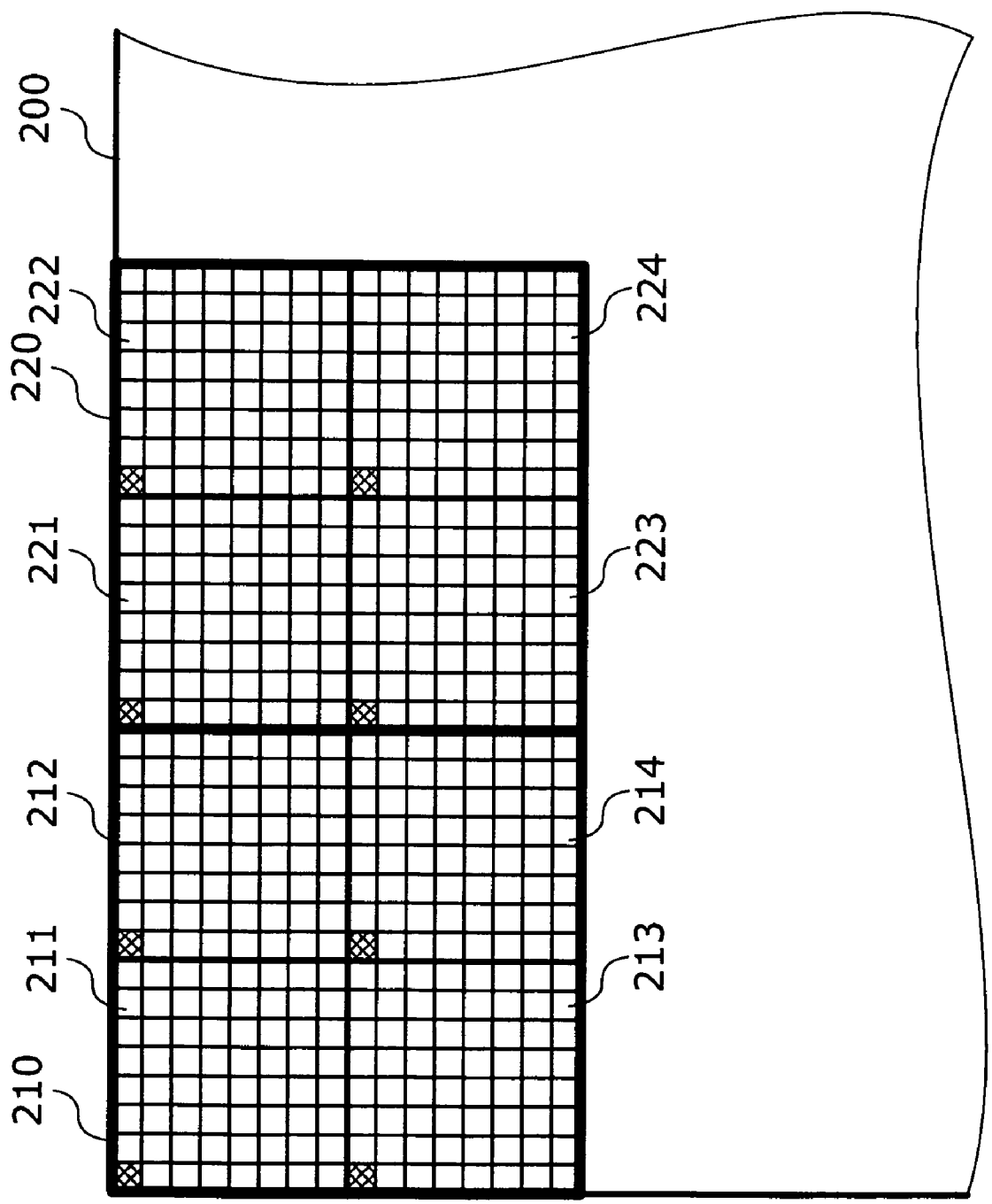
FIG. 4 shows blocks constituting a source picture.

FIG. 4 shows blocks constituting a source picture. As can be seen from FIG. 4, a source picture 200 is divided into a plurality of blocks 211 to 214 and 221 to 224, each formed from eight by eight pixels. Compressing this source picture 200 yields an MCU 210 from four blocks 211 to 214, as well as another MCU 220 from another four blocks 221 to 224.

The source picture 200 is a color picture represented in Y, Cb, and Cr components.

FIG. 5 shows the components of a source picture. Blocks 211 to 214 constituting an MCU 210 can be broken into Y components 30, Cb components 41, and Cr components 42. The Y components 30 are formed from four blocks 31 to 34 corresponding to the four blocks 211 to 214, respectively. As seen, there is one Y component corresponding to each single pixel of the source picture 200.

The Cb components 41, on the other hand, are common to the four blocks 211 to 214, as are the Cr components 42. In other words, there is only one set of Cb and Cr components for every four pixels of the source picture 200.

The source picture 200 with the above-described structure is subjected to a process of compressing. The compression process starts with DCT processing, which replaces each component of a pixel with a DCT coefficient.

Figure 6:
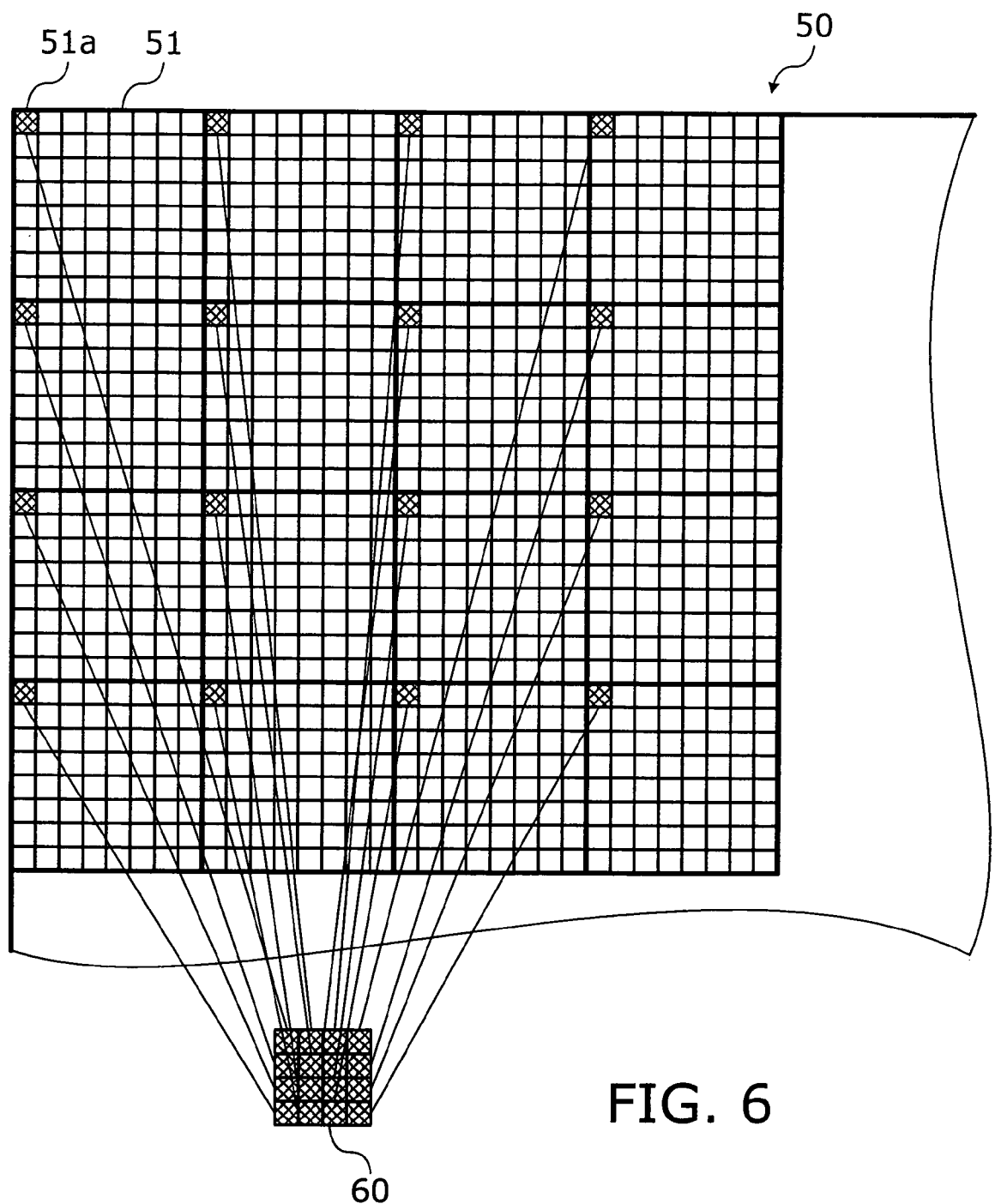
FIG. 6 shows a DCT-processed picture.

FIG. 6 shows a DCT-processed picture, particularly its Y components 50. Those DCT-processed Y components 50 are DCT coefficients transformed from luminance values of pixels constituting a source picture. The DCT coefficient located at the upper left corner of each block of the Y components 50 is a DC component, or an average pixel value of an entire block (actually with a certain amount of offset). Take a block 51, for instance. The upper-left DCT coefficient 51a is the DC component of this block 51.

Think of an image 60 formed solely from DC components of blocks. This image 60 is a reduced-size picture, or a thumbnail image, one eighth as large as the source picture in terms of the number of pixels on each side.

Every DCT coefficient in the DCT-processed Y components 50 is then quantized. DC components are also coded by calculating a difference of a block from its neighboring block. After replacing DC components of each block with their relative differences, the coding process assigns a distinct code to each value using Huffman coding algorithms or the like.

While FIG. 6 only shows Y components 50, Cr components and Cb components also undergo the quantization of DCT coefficients and coding of DC components in a similar way. Those components are coded individually and stored as MCUs in the compressed data buffer 130.

Figure 7:
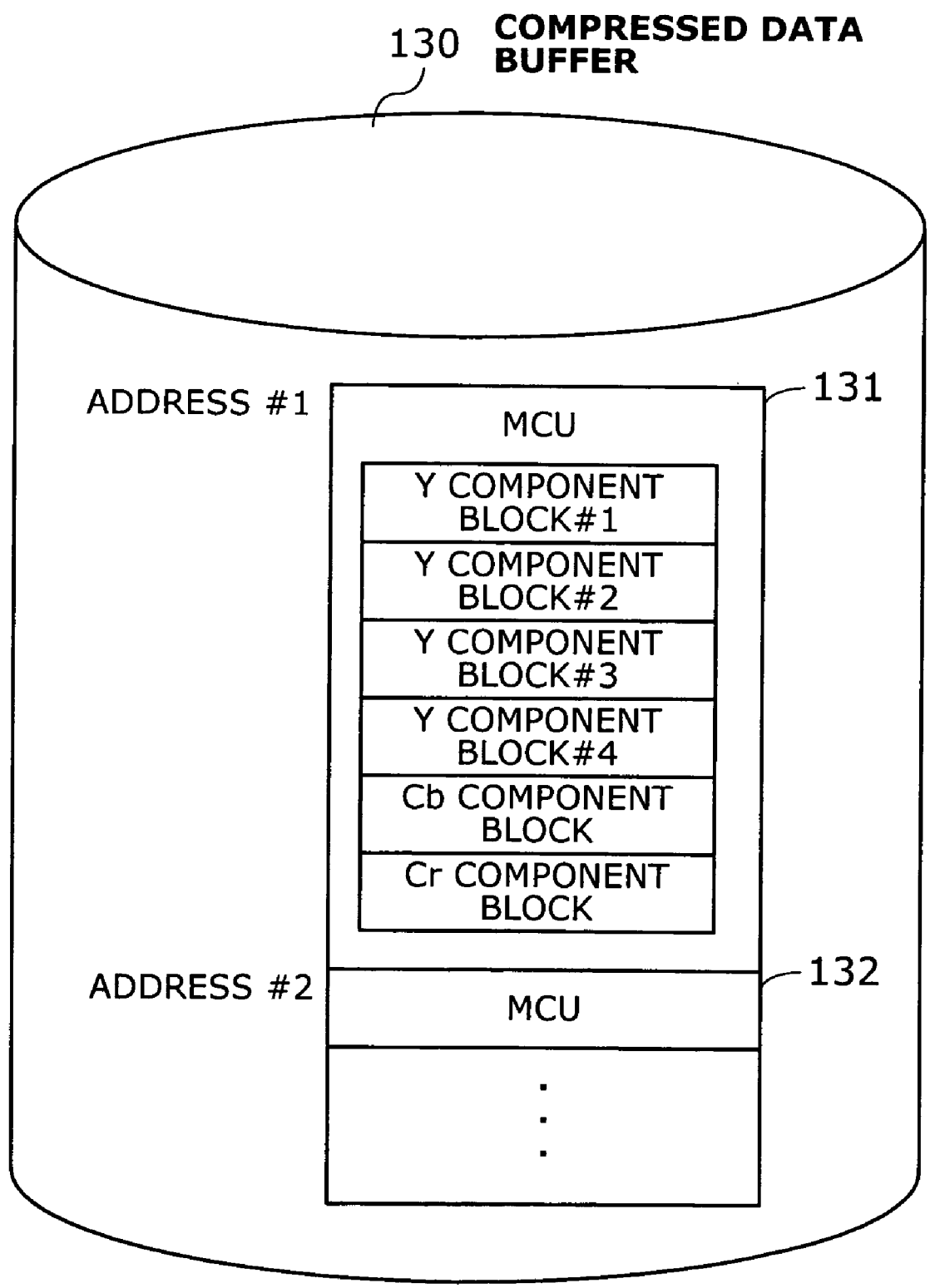
FIG. 7 shows a typical data structure of a compressed data buffer.

FIG. 7 shows a typical data structure of a compressed data buffer. This compressed data buffer 130 stores data of MCUs 131, 132, and so on. The first embodiment assumes that they are compressed in the YCbCr420 format, with a limit of 64 KB. The compressed data buffer 130 thus has a capacity of 64 KB, and each area storing an MCU 131, 132, and so on can be specified by a 16-bit address (e.g., address#1, address#2, and so on).

The MCU 131 is formed from four Y component blocks (Y component block #1, Y component block #2, Y component block #3, and Y component block #4), one Cb component block, and one Cr component block. DC components are extracted from each of those component blocks and sent to the reference image buffer 150.

Figure 8:
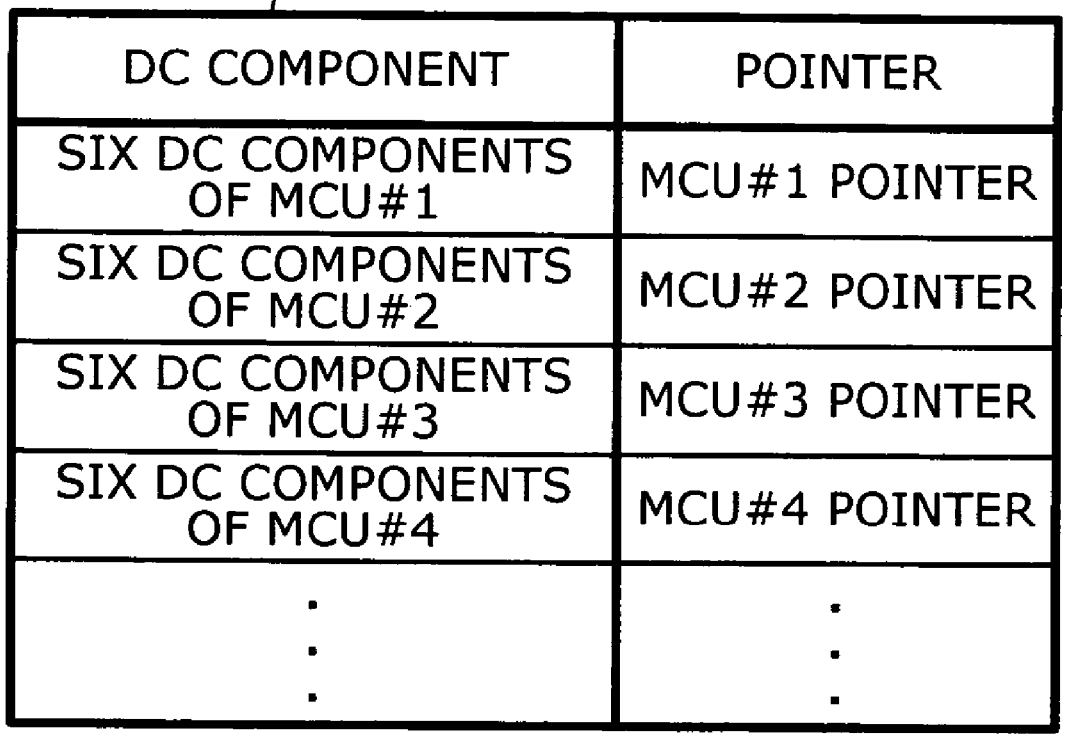
FIG. 8 shows a typical data structure of a reference image buffer.

FIG. 8 shows a typical data structure of a reference image buffer. This reference image buffer 150 has two data fields titled "DC component" and "Pointer." The reference data extraction circuit 141 extracts DC components of the first MCU (MCU#1) and stores them as a first entry of the reference image buffer 150. The DC components of MCU#1 include those of 4-block Y components, 1-block Cb components, and 1-block Cr components. Likewise, each time a new set of DC components are extracted from subsequent MCUs (MCU#2, MCU#3, MCU#4, and so on), they are added to the reference image buffer 150 as new entries following the MCU#1's.

When the first MCU (MCU#1) has been sent to the compressed data buffer 130 by the MCU pointer extraction circuit 142, the top address of that MCU#1 (address#1) is entered to the pointer field. Likewise, each time a subsequent MCU (MCU#2, MCU#3, MCU#4 . . . ) is sent to the compressed data buffer 130, its memory address (address#2, address#3, address#4 . . . ) is added to the pointer field.

The reference image buffer 150 will be filled in with DC components and pointers (addresses) in this way, in order from top to bottom of its storage area. That is, DC components and storage address of an MCU are stored together in the same entry of DC component and pointer fields of the reference image buffer 150.

The reference image buffer 150 maintains absolute (non-differenced) DC component values, so that any MCU alone can be decoded back to its original image. More specifically, recall that the DC components in an MCU, except for those in some particular blocks, have been differentially coded with respect to their respective neighboring blocks. Without a reference image buffer 150, the original image of an MCU could only be obtained by reproducing a series of other MCUs, all the way from the one with non-coded DC components to that MCU of interest. This means that, without a reference image buffer 150, it would not be possible to decode a single MCU alone.

As can be seen from the above, the present embodiment enables decoding of any single MCU without referring to other MCUs, thus making it easy to edit (e.g., rotate) a reproduced picture.

The following section will now describe a process of displaying a picture based on its compressed data.

Figure 9:
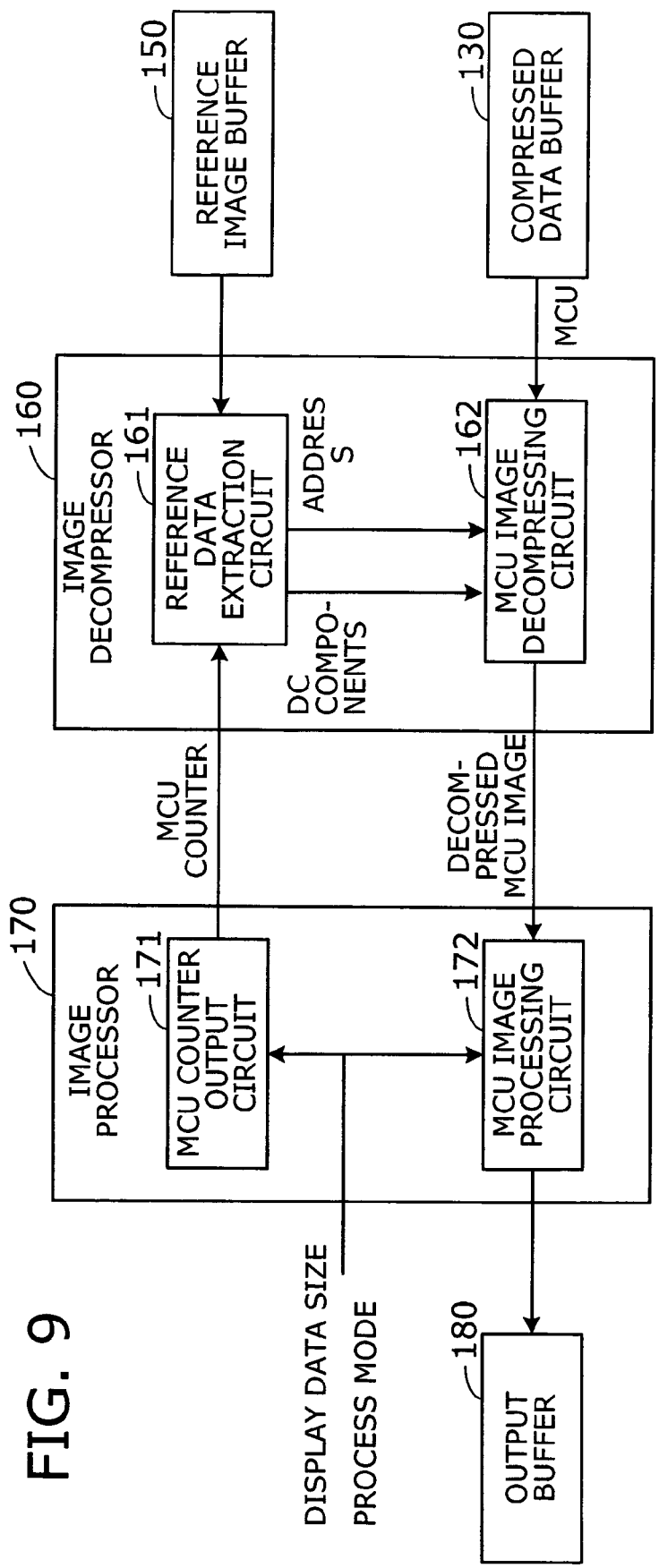
FIG. 9 shows the internal structure of an image decompressor and an image processor.

FIG. 9 shows the internal structure of an image decompressor and an image processor. The picture processing and displaying apparatus 100 employs an image decompressor 160 and an image processor 170 to display a picture reproduced from its compressed data. Some editing operations have been specified beforehand, so that the picture will be displayed after the editing. The first embodiment assumes that a particular display data size and process mode are specified. The display data size of a picture may be specified by, for example, height and width parameters in units of pixels. The process mode may be, for example, rotation, mirror image, thumbnail, mosaic, or the like. In rotation mode, a specific rotation angle (e.g., 90 degrees, 180 degrees, 270 degrees) can be designated.

The specified parameters of display data size and process mode are given to the image processor 170. The image processor 170 produces picture data as specified, out of an image stored in the compressed data buffer 130, and it writes the result in the output buffer 180. To this end, the image processor 170 comprises an MCU counter output circuit 171 and an MCU image processing circuit 172.

The MCU counter output circuit 171 determines in what order the MCUs should be read out, according to the specified display data size and process mode and outputs MCU counter values in that order. The MCU counter is a piece of data that specifies an order of MCUs stored in the compressed data buffer 130. Each MCU in the compressed data buffer 130 can be uniquely specified by an MCU counter value.

The MCU image processing circuit 172 manipulates MCU source images supplied from the image decompressor 160 according to a specified display data size and process mode before sending them to the output buffer 180.

The image decompressor 160 comprises a reference data extraction circuit 161 and an MCU image decompressing circuit 162.

The reference data extraction circuit 161 receives an MCU counter value from the MCU counter output circuit 171 and retrieves its corresponding DC components and address from the reference image buffer 150. More specifically, the received MCU counter value gives a displacement relative to the top of the reference image buffer 150. The reference data extraction circuit 161 retrieves a record (DC components and address) with that displacement. The retrieved DC components and address are then passed to the MCU image decompressing circuit 162.

The MCU image decompressing circuit 162 receives an address from the reference data extraction circuit 161 and retrieves an MCU corresponding to that address from the compressed data buffer 130. The MCU image decompressing circuit 162 decompresses the retrieved MCU using DC components supplied also from the reference data extraction circuit 161. More specifically, the MCU image decompressing circuit 162 replaces coded DC components in the retrieved MCU with non-coded DC components supplied from the reference data extraction circuit 161. The MCU image decompressing circuit 162 then decompresses the MCU and passes the resulting decompressed MCU image to the image processor 170.

Each time a new set of compressed data enters the compressed data buffer 130, the circuits described above process given data to construct a picture for display. That is, when the compressed data buffer 130 receives compressed data, the MCU counter output circuit 171 begins outputting a series of MCU counter values corresponding to a given display data size and process mode. An MCU counter value is provided each time the image decompressor 160 outputs a decompressed MCU image.

The reference data extraction circuit 161 receives MCU counter values from the MCU counter output circuit 171 and retrieves corresponding DC components and addresses from the reference image buffer 150. Each set of retrieved DC components and address is then passed to the MCU image decompressing circuit 162.

The MCU image decompressing circuit 162 retrieves an MCU from a storage area of the compressed data buffer 130 that is specified by the received address. This MCU is decompressed by using the DC components supplied from the reference data extraction circuit 161, the result being a decompressed MCU image.

Such decompressed MCU images are passed to the MCU image processing circuit 172, where they are edited according to a specified display data size and process mode. The MCU image processing circuit 172 writes the resulting picture in the output buffer 180.

The present embodiment edits and visualizes compressed image data in the way described above. The following section will now describe a 90-degree rotation of a picture as a specific example of image editing.

Figure 10:
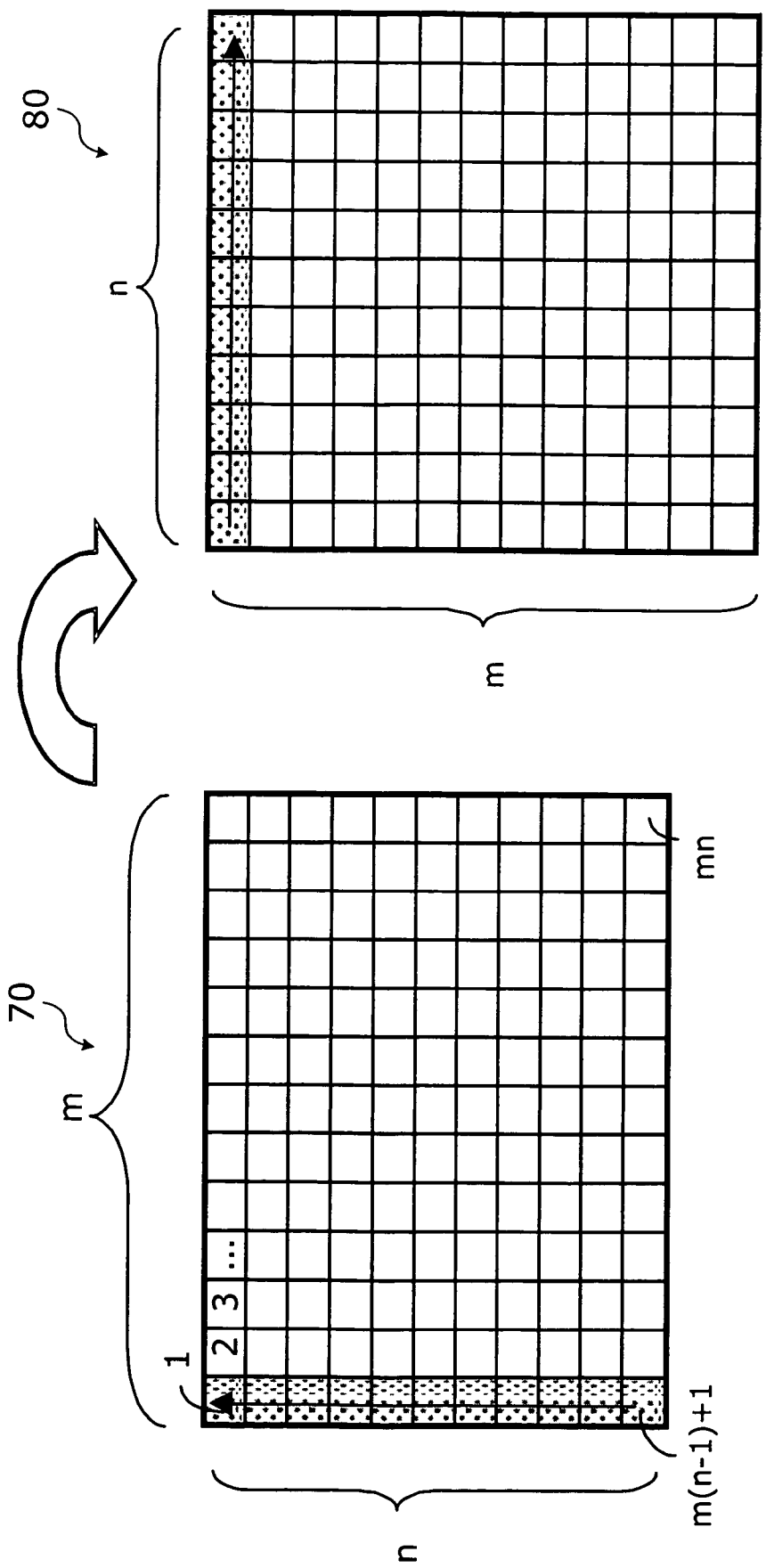
FIG. 10 shows an output order that an MCU counter follows when rotating a picture by 90 degrees.

FIG. 10 shows an output order that an MCU counter follows when rotating a picture by 90 degrees. Assume that a picture 70 is to be rotated by 90 degrees clockwise as shown in FIG. 10.

This picture 70 is formed from a plurality (m×n) of MCUs, where m and n are integers not smaller than one, representing the number of columns and rows, respectively. The compression process proceeds from upper MCUs to lower MCUs in the picture 70, and left MCUs to right MCUs on each row.

This means that the compression process begins at the upper-left corner of the picture 70 and then proceeds to other MCUs from left to right. If the right end of a row is reached, then the process advances to the left end of the next row.

FIG. 10 includes serial numbers of MCUs in the picture 70 to indicate specifically in what order they will be compressed. That is, the upper-left MCU is numbered 1, and the subsequent MCUs on its right are numbered 2, 3, and so on. The leftmost MCU on the bottom row is numbered m(n−1)+1, and the rightmost MCU on the same row is numbered mn.

The compressed MCUs are stored in the compressed data buffer 130 in the order that they are compressed. In addition, the DC components and address of those MCUs are stored in the reference image buffer 150 also in the order that they are compressed. In reading MCUs for decompression, their sequence is designated by their storage numbers, which have been determined when they are stored.

To achieve this, the MCU counter output circuit 171 is designed to provide an MCU counter specifying storage numbers of MCUs to be decompressed. The initial value and update algorithm for an MCU counter are defined in accordance with a desired process mode (editing operation), so that the MCUs can be decompressed in an appropriate order that is suitable for the process mode.

In the example of FIG. 10, a desired picture 80 is produced by writing individual MCU images in the output buffer 180, beginning at the upper left corner. To rotate the picture 70 by 90 degrees, MCU unit images have to be decompressed in a proper sequence, beginning at the lower left corner and proceeding toward the top row. Accordingly, the MCU counter is initialized to m(n−1)+1.

The MCU counter decrements itself with a step size of m, thereby selecting and decompressing a new MCU located on top of the current MCU in the source picture 70. If the MCU counter falls below m, then it means that the present column of the picture 70 has been finished. It is therefore necessary to turn to the bottommost MCU on the right column. That is, if the MCU counter has an integer value of k (1≦k<m), then it will be updated with a new value of m(n−1)+(k+1). The MCU counter stops updating itself when it has reached m.

By changing its values in the way described above, the MCU counter points to MCUs at m(n−1)+1, m(n−2)+1, . . . , 1, m(n−1)+2, m(n−2)+2, . . . , mn, m(n−1), . . . m in that order. Decompressing MCUs in this order results in a 90-degree rotated picture 80.

It should be noted that this process has to include rotation of each MCU image to yield a 90-degree rotated picture 80.

Figure 11:
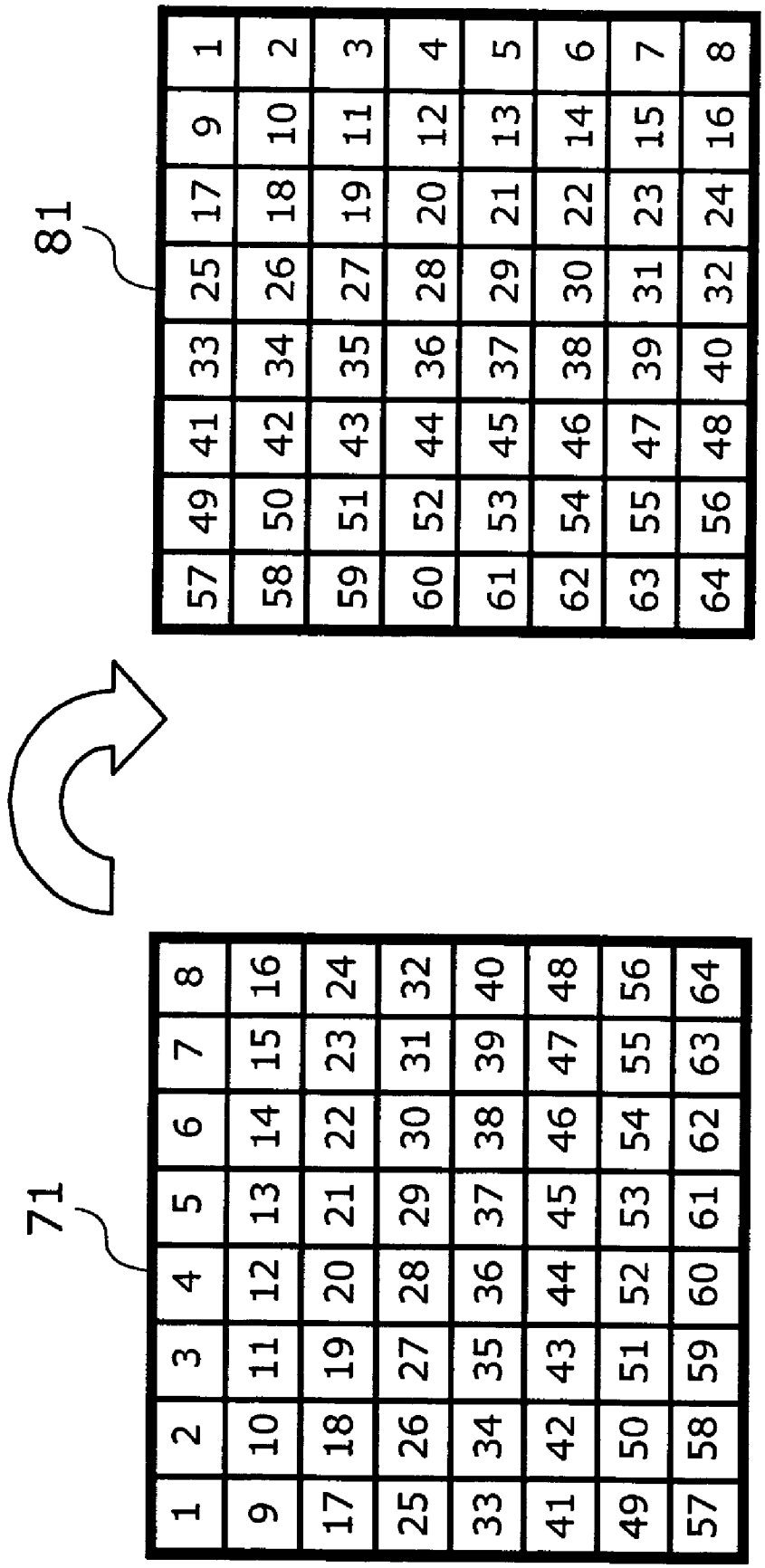
FIG. 11 shows rotation of an MCU image.

FIG. 11 shows a process of rotating an MCU image, assuming that each MCU is formed from a single block (8×8 pixels). Specifically FIG. 11 shows an original MCU image 71 and a rotated MCU image 81. The original image 71 consists of 8×8 pixels, numbered 1 to 64. The pixel numbers show how the pixels of the original image 71 will move to the destination MCU image 81 as a result of rotation. For example, the pixel at the upper left corner of the image 71 will move to the upper right corner of the image 81.

The image can still be rotated easily even in the case where an MCU consists of four blocks, since the difference from the case of FIG. 11 is only that the number of pixels is doubled in either dimension. Other image manipulations such as 180-degree rotation, 270-degree rotation, and mirror imaging can be implemented similarly to the case of 90-degree rotation. Specifically, they are achieved by specifying an appropriate output order of MCUs and rotating each MCU image consisting of 64×4 pixels (i.e., 64 pixels per block multiplied by the number of blocks).

Every MCU that the MCU image processing circuit 172 has received undergoes such pixel rearrangement operations. The resulting image in the output buffer 180 is a 90-degree rotated version of what is decompressed from compressed data in the compressed data buffer 130.

As can be seen from the above explanation, the present embodiment has a reference image buffer 150 to store DC components and address of each MCU of compressed data. The reference image buffer 150 enables compressed data to be expanded, decompressed, and manipulated in a block by block fashion. The present embodiment thus achieves realtime image editing (e.g., rotation) with less memory requirements. Expansion, decompression, and manipulation of compressed data are performed on an MCU basis, which reduces the latency from input to output of images, besides eliminating the need for a large-capacity memory.

A conventional technique would decode given JPEG data entirely before rotating the image. This conventional technique, however, requires temporary memory for storing a decoded image in its entirety. Writing and reading images in a memory are relatively time-consuming, compared with processing speeds of other circuits. An increase in the capacity of an intermediate memory would lead to a longer latency.

The first embodiment, on the other hand, retrieves part of compressed data as is and outputs the retrieved data sequentially after rotating by a specified angle. This technique eliminates a memory that would be necessary for storing an entire picture reproduced from compressed data. Also the latency is reduced because of removal of memory devices that are placed between input and output of photographed images. Writing DC components and addresses to a reference image buffer 150 would never affect the latency because it can be performed in parallel with writing MCUs to the compressed data buffer 130.

SECOND EMBODIMENT

The second embodiment is directed to easy production of thumbnail images with a shrinkage ratio of 8:1.

Creating thumbnail images is one of the typical image editing operations. Thumbnail images can be produced by subsampling MCU data at an appropriate ratio. Particularly, one-eighth sized thumbnails can be produced by selectively outputting DC components of each MCU.

Figure 12:
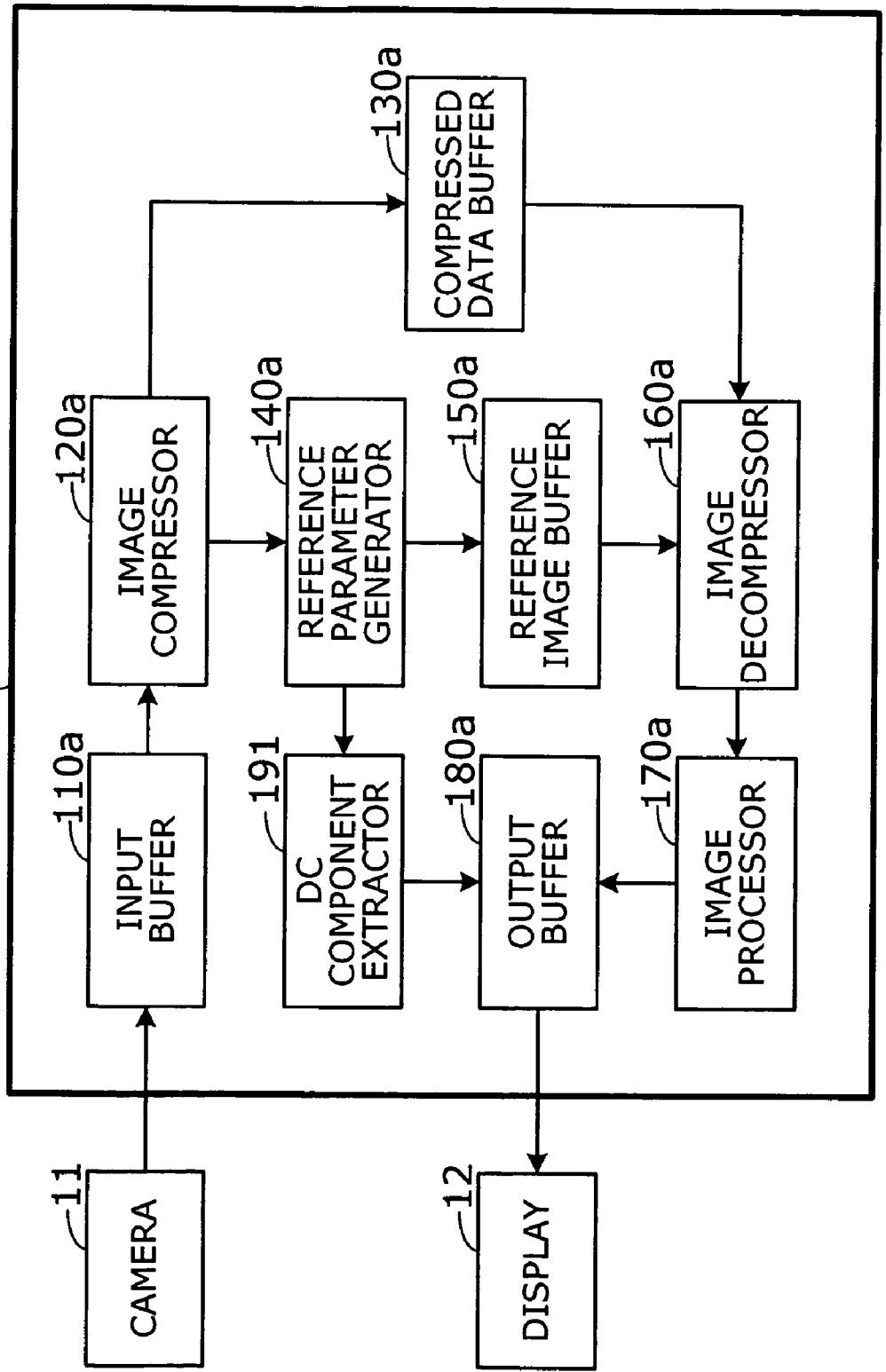
FIG. 12 is an internal block diagram of a picture processing and displaying apparatus according to a second embodiment.

FIG. 12 is an internal block diagram of a picture processing and displaying apparatus according to the second embodiment. The illustrated picture processing and displaying apparatus 100a is connected to a camera 11 and a display 12 as in the first embodiment. The picture processing and displaying apparatus 100a comprises the following elements: an input buffer 110a, an image compressor 120a, a compressed data buffer 130a, a reference parameter generator 140a, a reference image buffer 150a, an image decompressor 160a, an image processor 170a, an output buffer 180a, and a DC component extractor 191. All those elements, except the DC component extractor 191, operate in the same way as in the first embodiment shown in FIG. 2. Note, however, that the reference parameter generator 140a offers an additional function of passing obtained DC components to the DC component extractor 191. Also, the image processor 170a has a function of suspending itself in the case the apparatus is in an operation mode where pictures are displayed as one-eighth sized thumbnail images.

The DC component extractor 191 receives DC components from the reference parameter generator 140a and places each of them as one pixel in the output buffer 180a. The picture formed only from DC components of MCUs is one eighth as large as the source picture. The DC component extractor 191 writes such an image in the output buffer 180a, thus causing a thumbnail image to appear on the display 12.

As can be seen from the above, the picture processing and displaying apparatus 100a can produce a thumbnail image easily since it employs a DC component extractor 191 that selectively sends DC components of a source picture to the output buffer 180a.

The same mechanism of the second embodiment may also be applied to creating mosaiced images. In this case, the DC component extractor 191 is configured to fill each MCU with its DC components.

Referring again to the example of FIG. 12, the illustrated apparatus assumes that thumbnail images are produced when a particular operation mode for that purpose is selected. In the case that the apparatus is dedicated for generation of thumbnail images, it does not need to have a compressed data buffer 130a, reference image buffer 150a, image decompressor 160a, or image processor 170a.

THIRD EMBODIMENT

The proposed apparatus may also be configured to rotate one-eighth sized thumbnail images.

Figure 13:
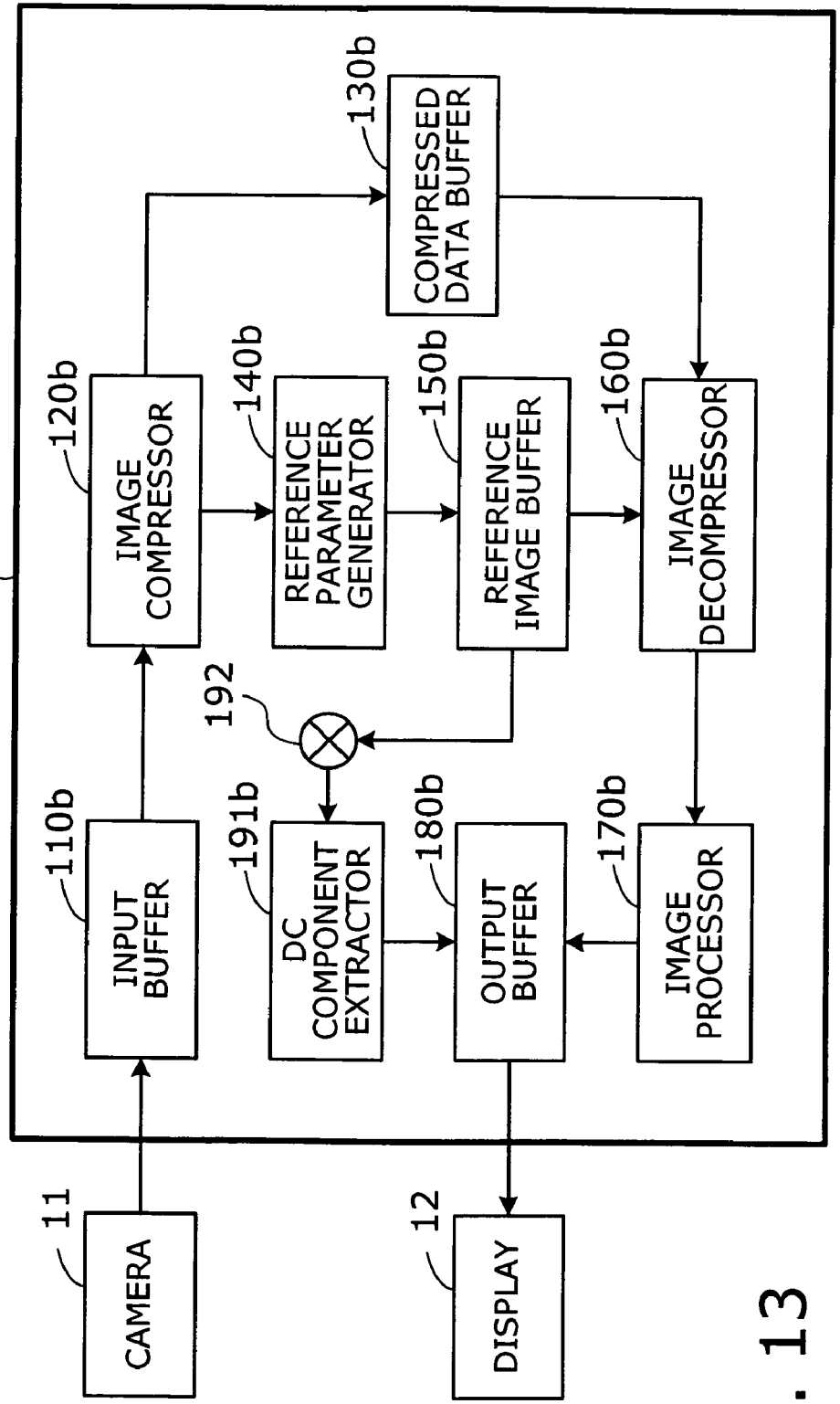
FIG. 13 is an internal block diagram of a picture processing and displaying apparatus according to a third embodiment.

FIG. 13 is an internal block diagram of a picture processing and displaying apparatus according to a third embodiment. This picture processing and displaying apparatus 100b is connected to a camera 11 and a display 12 as in the first embodiment. The picture processing and displaying apparatus 100b comprises the following elements: an input buffer 110b, an image compressor 120b, a compressed data buffer 130b, a reference parameter generator 140b, a reference image buffer 150b, an image decompressor 160b, an image processor 170b, an output buffer 180b, a DC component extractor 191b, and an image rotation circuit 192. All those elements, except of the reference parameter generator 140b and image rotation circuit 192, operate in the same way as in the second embodiment shown in FIG. 12. The reference parameter generator 140b has the same functions as the reference parameter generator 140 of the first embodiment shown in FIG. 2.

When the specified operation mode demands that one-eighth sized thumbnail images be rotated by 90 degrees, the image rotation circuit 192 transfers DC components from the reference image buffer 150b to the DC component extractor 191b in an appropriate order that is previously determined in the same way as described in FIG. 10.

Rotation of a thumbnail image can be achieved by changing the order of reading out DC components.

While the example of FIG. 13 assumes a case where the rotation of thumbnail images is activated by changing operation modes, the apparatus may be dedicated for rotated thumbnail images. If this is the case, the apparatus does not need to have a compressed data buffer 130b, reference image buffer 150b, image decompressor 160b, or image processor 170b.

All the first to third embodiments process compressed data for realtime display. In digital camera applications, the proposed apparatus will be added a function of transferring compressed data from its compressed data buffer to another memory at the timing when the shutter button is pressed. In this case, the picture processing and displaying apparatuses of the first to third embodiments enable their display to function as a viewfinder since the latency from input to display is low. This means that the camera will record nearly the same picture as what is seen on the display screen at the moment when the shutter is released.

The display actually shows past pictures that were taken some time earlier, which is known as latency. Conventional apparatuses have a large latency, meaning that the picture photographed at the time of shutter release could be quite different from what is shown on the display. By contrast, the picture processing and displaying apparatuses according to the foregoing embodiments operate with a low display latency, minimizing the difference between what is seen on the display and what is recorded when the shutter button is pressed. The user can therefore take a picture exactly as he/she has intended.

The picture processing and displaying apparatuses of the second and third embodiment have a function to create thumbnail images. They may be added an output buffer for thumbnail images, so that a picture can be displayed not only in normal size, but also in thumbnail form, on different displays in a realtime fashion. That is, their image processor and DC component extractor are configured to write data in two output buffers, which enables the image processor to edit and display normal size pictures, while allowing the DC component extractor to display thumbnail images. This feature can be used effectively in mobile phones with a plurality of display screens. Think of a folding mobile phone, for example. In this case, the present invention can be used to output a normal-size picture on a display that becomes invisible when the phone is folded, while showing a thumbnail image on another display that is visible when the phone is folded.

According to the foregoing embodiments, the reference image buffer 150 stores a set of DC components of each MCU and its associated MCU pointer. Those embodiments may be modified such that a pointer be created for each DC component for storage in the reference image buffer 150. The pointer associated with a certain DC component points at the top address of AC components of the same block. When decompressing a picture, a DC component read out of the reference image buffer 150 is placed before an AC component that is indicated by the pointer. This makes it possible to decompress blocks individually.

Further, the foregoing embodiments assumes that the compressed data buffer 130 stores full JPEG data (including coded DC components) that can be decompressed immediately. It may also be possible to configure the compressed data buffer 130 to store image data excluding DC components. If this is the case, the DC components stored in the reference image buffer 150 are used to decompress JPEG data even when there is no need to edit (e.g., rotate) the picture.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A picture processing and displaying apparatus for compressing, decompressing, and editing a picture, the apparatus comprising:
a compressed data buffer to store compressed data;
a reference image buffer to store parameters used in decompressing data;
an image compressor that divides a given source picture into a plurality of unit images each being a two-dimensional block of pixels, produces compressed data of the source picture by calculating reference data representing an average level of the two-dimensional block of pixels of each individual unit image and converting the reference data of at least one unit image to another value determined from comparison between that reference data and prescribed data in another unit image, and stores the resulting compressed data in the compressed data buffer;
a reference parameter generator that receives, from the image compressor, original reference data corresponding to each and every unit image having undergone the reference data conversion and stores the received reference data in the reference image buffer, together with information that associates the stored reference data with the unit images corresponding thereto, in parallel with the storing of the compressed data in the compressed data buffer;
an image decompressor that retrieves a plurality of compressed unit images from the compressed data buffer in an order determined according to a specified image editing operation, retrieves original reference data corresponding to each retrieved unit image from the reference image buffer, and decompresses the retrieved compressed unit images by using the retrieved reference data; and
an image processor that edits and outputs the unit images decompressed by the image decompressor, according to the specified image editing operation.

2. The picture processing and displaying apparatus according to claim 1, wherein the image compressor converts reference data of at least one compressed unit image to another value determined in accordance with a difference of that reference data from reference data of another unit image.

3. The picture processing and displaying apparatus according to claim 1, wherein the specified image editing operation is image rotation.

4. The picture processing and displaying apparatus according to claim 1, wherein:
the image compressor compresses the unit images constituting the source picture in a predetermined order; and
each time a new unit image is compressed, the reference parameter generator receives the corresponding reference data.

5. The picture processing and displaying apparatus according to claim 1, wherein the reference parameter generator associates the received reference data with the unit images corresponding thereto by using a memory address of each unit image in the compressed data buffer.

6. The picture processing and displaying apparatus according to claim 1, wherein the image decompressor begins decompressing the unit images each time the compressed data buffer receives compressed data representing a whole picture.

7. A picture processing and displaying apparatus for compressing, decompressing, and editing a picture, the apparatus comprising:
a compressed data buffer to store compressed data;
an image compressor that divides a given source picture into a plurality of unit images each being a two-dimensional block of pixels, produces compressed data of the source picture by calculating reference data representing an average level of the two-dimensional block of pixels of each individual unit image and converting the reference data of at least one compressed unit image to another value determined from comparison between that reference data and prescribed data in another unit image, and stores the resulting compressed data in the compressed data buffer;
a reference parameter generator that receives, from the image compressor, original reference data corresponding to each and every unit image having undergone the reference data conversion, in parallel with the storing of the compressed data in the compressed data buffer; and a reduced picture generator that produces a reduced-size picture by arranging the reference data that the reference parameter generator has received.

8. The picture processing and displaying apparatus according to claim 7, further comprising a reference image buffer for storing parameters used in decompressing data, wherein:

the reference parameter generator stores the received reference data in the reference image buffer, together with information that associates the stored reference data with the corresponding unit images; and the reduced picture generator receives the reference data from the reference image buffer in an order determined according to a specified image editing operation.

9. A picture processing and displaying method for compressing, decompressing, and editing a picture, the method comprising:

dividing a given source picture into a plurality of unit images each being a two-dimensional block of pixels;

producing compressed data of the source picture by calculating reference data representing an average level of the two-dimensional block of pixels of each individual unit image and converting the reference data of at least one unit image to another value determined from comparison between that reference data and prescribed data in another unit image, and storing the resulting compressed data in a compressed data buffer;

receiving original reference data corresponding to each and every unit image having undergone the reference data conversion;

storing the received reference data in a reference image buffer, together with information that associates the stored reference data with the unit images corresponding thereto, in parallel with the storing of the compressed data in the compressed data buffer;

retrieving a plurality of compressed unit images from the compressed data buffer in an order determined according to a specified image editing operation, as well as original reference data corresponding to each retrieved unit image from the reference image buffer;

decompressing the retrieved compressed unit images by using the retrieved reference data; and editing and outputting the decompressed unit images, according to the specified image editing operation.

* * * * *